United States Patent Office 3,442,904
Patented May 6, 1969

3,442,904
CERTAIN 4-AMINO-3-OXAZOLINES HAVING HALOGENATED HYDROCARBON SUBSTITUENTS IN THE 2- AND 5-POSITIONS
William J. Middleton, Wilmington, Del., assignor to E. I. du Pont de Nemours and Company, Wilmington, Del., a corporation of Delaware
No Drawing. Continuation-in-part of application Ser. No. 555,974, June 8, 1966. This application Feb. 27, 1967, Ser. No. 618,991
Int. Cl. C07d 85/36
U.S. Cl. 260—307                    20 Claims

ABSTRACT OF THE DISCLOSURE

Certain 4-amino-3-oxazolines having halogenated hydrocarbon substituents in the 2- and 5-positions, e.g., 4-amino-2,2,5,5-tetrakis(trifluoromethyl)-3-oxazoline and 4-amino-2-difluoromethyl-6,6,7,7,8,8-hexafluoro - 2 - trifluoromethyl-3-aza-1-oxaspiro[4,3]oct-3-ene and their tautomers, useful as plasticizers for polymeric materials, and their preparation, e.g., from reaction of a polyhaloisopropylidenimine, e.g., pentafluoroisopropylidenimine, and a polyhaloketone cyanhydrin, e.g., hexafluorocyclobutanone cyanhydrin, in a polar solvent and in the presence of a strongly basic amine.

Related application

This application is a continuation-in-part of my co-assigned copending application, Ser. No. 555,974, filed June 8, 1966, and now abandoned.

Field of the invention

This invention relates to, and has as its principal objects provision of, novel 4-amino-3-oxazolines having halogenated hydrocarbon substituents in the 2- and 5-positions and the preparation of the same.

Details of the invention

The novel compounds of this invention are 4-amino-3-oxazolines having halogenated hydrocarbon substituents in the 2- and 5-positions of the formula

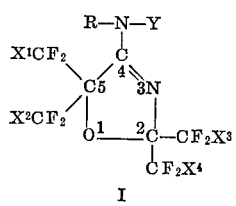

I wherein: $X^1$, $X^2$, $X^3$, and $X^4$ are alike or different and are hydrogen, fluorine or chlorine, or $X^1$ and $X^2$ taken together can be perfluoroalkylene having 1–2 carbon atoms; R is hydrogen or alkyl of 1–4 carbons; and Y is hydrogen, alkyl of 1–4 carbons,

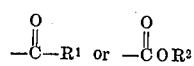

$R^1$ being alkyl of 1–4 carbons or aryl, alkyaryl, or aralkyl of 6–10 carbons, and which alkyl and aryl radicals may be substituted with up to three halogens (fluorine, chlorine, or bromine), and $R^2$ being alkyl or cycloalkyl of up to 10 carbons; all with the proviso that the total number of carbon atoms in R and Y together does not exceed 14.

More particularly, the compounds of this invention are the 3-oxazolines of Formula I and their isomeric or tautomeric forms, the 4-iminooxazolidines of the formula

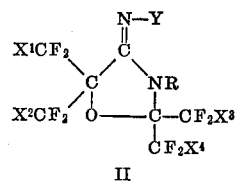

II wherein R, Y and the X's have the meanings given above; and selected salts and N-acyl and N-alkyl derivatives of the amino and imino compounds of Formulas I and II.

Compounds of the above Formulas I and II in which R is hydrogen and the X's and Y are previously defined are tautomers and exist in tautomeric equilibrium, especially in solution, as shown by the following formulas:

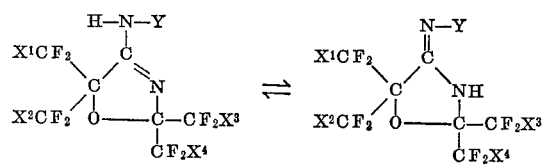

Consequently, when one tautomer is mentioned in this application, it is intended that the other also be included. As would be expected from this tautomeric equilibrium involving a mobile proton, these compounds have marked acidic properties. For example, this hydrogen will exchange rapidly with deuterium when $D_2O$ is added to an acetone solution of the compound, as evidenced by the disappearance of the NH absorption band in the nuclear magnetic resonance spectrum.

In the special case of 4-amino-2,2,5,5-tetrakis-(trifluoromethyl)-3-oxazoline, in which both R and Y are H, only a single absorption band is observed from the two protons in the N.M.R. spectrum at room temperature; and they both exchange rapidly with $D_2O$.

Since compounds of types I and II in which R is H exhibit acidic properties, they can form salts with bases. The salts from either tautomer are identical, for their anions can be represented by the following resonance forms corresponding to the tautomeric forms of types I and II

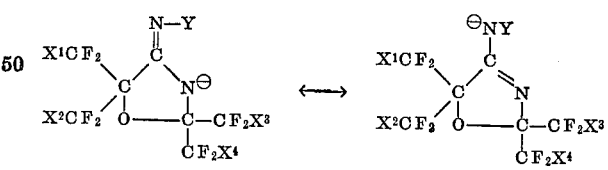

For example, 4-amino-2,2,5,5-tetrakis(trifluoromethyl)-3-oxazoline (R and Y are H, and the X's are F) is a weak acid. It can be titrated with a strong base, such as tetramethylammonium hydroxide, in a nonaqueous solvent such as acetone or pyridine, to give a sharp end-point. The salt formed in this titration can be represented by the resonance structures:

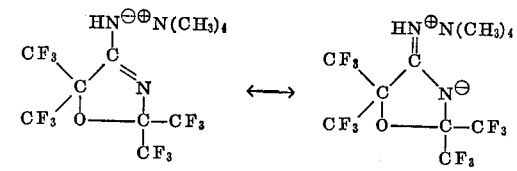

4 - acetylamino - 2,2,5,5 - tetrakis(trifluoromethyl)-3-oxazoline (R is H, Y is $CH_3CO$—) is a stronger acid. It can be titrated in water with sodium hydroxide to give a salt that can be represented by the resonance structures:

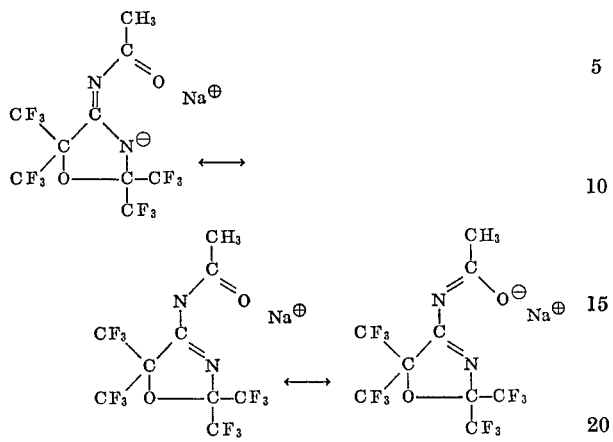

Compounds of the above Formulas I and II in which neither R nor Y is H exist as isomeric structures similar to types I and II above. Either one or both types of these compounds can be prepared in a single reaction by causing a tautomeric mixture, in which R is H or R and Y both are H, to react with an alkylating or acylating reagent. For example, dimethyl derivatives (where R and Y are CH₃) corresponding to the type I and type II can both be prepared in a single reaction by treating 4 - amino-2,2,5,5-tetrakis(trifluoromethyl)-3-oxazoline with dimethyl sulfate.

The present novel compounds of Formulas I and II, wherein Y is H, and which serve as precursors for the remaining compounds of Formulas I and II, are prepared by the reaction of one mole of a salt of polyhaloketone cyanhydrin having the formula

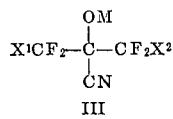

wherein M is an alkali metal or an amine and X¹ and X² are as defined previously, with one mole of a polyhaloisopropylidenimine of the formula

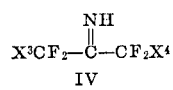

wherein X³ and X⁴ are as defined previously. The reaction is preferably carried out in the presence of an inert, polar, reaction medium, preferably organic, such as dimethylformamide; dimethyl sulfoxide; liquid nitriles, e.g., acetonitrile and benzonitrile; glycol ethers, e.g., the dimethyl ethers of ethylene and diethylene glycols; etc., although the reaction can be carried out without added solvent.

In one embodiment of the above process, the compounds of Formula I or II, where Y is hydrogen, are prepared in two steps. The first step consists of treating a polyhaloketone of the formula

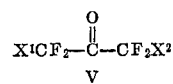

in which X¹ and X² are as previously defined, with an alkali metal cyanide, such as sodium cyanide or potassium cyanide, preferably in the presence of a polar solvent such as dimethylformamide, acetonitrile, dimethyl sulfoxide, or diethylene glycol dimethyl ether (diglyme), at a temperature of from −50° to 100° C. to form an alkali metal salt of the ketone cyanhydrin (compare my U.S. Patent No. 3,310,570). The salt of the ketone cyanhydrin can be isolated, if desired, by cooling the reaction mixture from this first step to room temperature, filtering and evaporating the filtrate to dryness under reduced pressure. However, it is not necessary to isolate the salt before carrying out the second step of the process as described below.

The second step consists of treating the cyanhydrin salt with an imine of Formula IV above; acidifying the resulting reaction mixture; and then purifying the product oxazolines and/or tautomeric oxazolidines by conventional means such as sublimation, distillation, or recrystallization.

In a second embodiment of the process for making the compounds of this invention, compounds of Formulas I and II, where the X's are hydrogen, are prepared by reaction of equimolar amounts of a polyhaloisopropylidenimine of Formula IV with a polyhaloacetone cyanhydrin of the following formula:

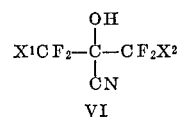

wherein X¹ and X² are hydrogen in the presence of a strongly basic amine, e.g., piperidine, triethylamine, diethylamine, or pyrrolidine, and preferably in an inert polar reaction medium of the types described previously, at ordinary or ambient temperatures. An exothermic reaction takes place which is usually complete in one to four days.

The reaction mixture is mixed with an equal volume of water and neutralized with a dilute organic acid, e.g., 10% hydrochloric acid. The resulting product oxazoline (and/or the tautomeric oxazolidine) is precipitated by dilution of the reaction mixture with water, and the precipitate is purified by conventional means such as recrystallization and sublimation.

The compounds of the invention of Formulas I and II in which R and/or Y is other than hydrogen can be prepared from those in which both R and Y are hydrogen, or the alkali metal salts of these latter compounds, by treatment with conventional alkylating or acylating agents. The resulting derivatives are also novel compounds which are useful for various purposes. The reaction can be carried out by contacting the oxazolines or oxazolidines (Formulas I or II, where R=Y=H), or their alkali metal salts, with the alkylating or acylating reagents, without solvent or in the presence of an inert solvent, at a temperature from 0° to 200° C., and isolation of the product by conventional means, such as distillation, recrystallization, or sublimation.

The alkylated derivatives are the compounds of Formulas I and II in which either R or Y or both are alkyl groups of 1–4 carbon atoms. Suitable alkylating reagents include alkyl sulfates, p-toluenesulfonates, and halides in which the alkyl moieties have 1–4 carbon atoms.

The acylated derivatives are the compounds of the above Formulas I and II in which Y is

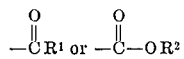

The compounds where Y is

are prepared by treating a compound of the above general Formulas I or II, where Y is H, with an acyl halide,

where R¹ is as defined hereinbefore and X is fluorine, chlorine or bromine, at elevated temperatures, e.g., 200–250° C., for several hours, e.g., 4–30 hours. The resulting solid acyl derivatives can be isolated from the reaction mixture by filtration and purified, if desired, by recrystallization.

The acylated derivatives in which Y is

are prepared in two steps. In the first step, a compound of Formula I, where Y and R are both H, is reacted with oxalyl chloride to form a 4-isocyanato-2,2,5,5-tetrakis-(polyhalomethyl)-3-oxazoline. In the second step, the isocyanato derivative is further reacted with an alcohol, $HOR^2$, where $R^2$ is defined as above. The resulting solid urethane can be isolated from the reaction mixture by filtration, and purified if desired by recrystallization.

The polyhaloketones of Formula V, in which the X's are hydrogen, fluorine or chlorine, or in which $X^1$ and $X^2$, taken together, are

where $a$ is 1 or 2, used in preparing the compounds of this invention are well-known materials shown, for example, in Lovelace, Rausch and Postelnek, "Aliphatic Fluorine Compounds," pages 190–192, Reinhold Publishing Corp., New York (1958).

The polyfluoroketone cyanhydrin reactant for the second process embodiment described above can be prepared by reaction of a polyfluoroketone of Formula V with an equimolar amount of hydrogen cyanide in the presence of piperidine as catalyst. The reaction can be carried out in the absence of added solvent, or, if desired, in the presence of an inert solvent such as acetonitrile. The reaction is complete by the end of the addition of the reactants, and the desired polyfluoroketone cyanhydrin can be isolated from the reaction mixture by distillation after removal of piperidine catalyst by treatment with an equivalent of p-toluenesulfonic acid.

The polyhaloisopropylidenimine reactants of Formula IV in which the X's are fluorine or chlorine can be obtained by reacting a polyfluoroketone of Formula V in which the X's are fluorine or chlorine with at least one one molar equivalent of ammonia at —50° to 10° C. followed by dehydration of the resulting aminohydroxy polyhaloalkane with a dehydrating agent in the presence of an acid acceptor, and then distilling to recover the imine. The imine reactant also may be prepared by reacting hydrazoic acid with a polyhalothioketone. Both of the aforesaid preparatory methods for the polyhaloalkylidenimine are disclosed and claimed in U.S. Patent No. 3,226,439 and described in J. Org. Chem. 30, 1398 (1965).

The imines of Formula IV in which $X^3$ and/or $X^4$ are hydrogen can be made by a modification of the method of Zeifman et al., Akad. nauk S.S.S.R. Doklady 153, 1334 (1963), for preparing hexafluoroisopropylidenimine. The process comprises first reacting the corresponding ketone with phenyl isocyanate in an autoclave at about 200° C. employing a triarylphosphine oxide catalyst to form the anil, i.e., the N-phenyl derivative of the imine. Then the anil is condensed with ammonia at ambient temperature, and aniline is split out thermally or with a strong acid such as phosphorus pentoxide to give the imine (Middleton, U.S. Patent No. 3,342,864).

Embodiments of the invention

There follow some nonlimiting examples illustrating the compounds and processes of the invention in more detail. Unless otherwise mentioned, temperatures and pressures in these examples were ambient. It will be noted that ring carbons are, in most cases, omitted from structural formulas.

Example 1.—4-amino-2,2,5,5-tetrakis(trifluoromethyl)-3-oxazoline $(X^1=X^2=X^3=X^4=F;\ R=Y=H)$

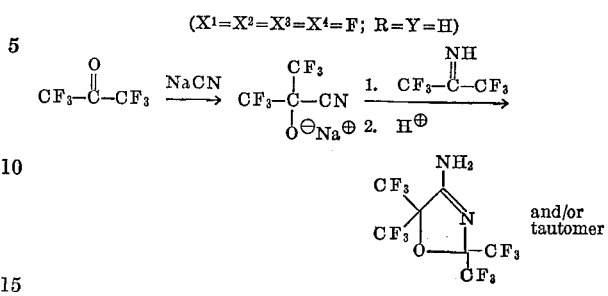

Hexafluoroacetone, 25 ml. at —78° C. (ca. 0.25 mole), was slowly distilled over a period of 30 minutes into a stirred suspension of 12.25 g. (0.25 mole) of powdered sodium cyanide in 200 ml. of acetonitrile. The temperature of the reaction rose spontaneously to 60° C. The reaction mixture was stirred for an additional 30 minutes, and then cooled to 25° C. Hexafluoroisopropylidenimine, 27 ml. at —10° C. (ca. 0.25 mole), was then distilled into the reaction mixture, and the mixture was stirred for 3 days at room temperature. An equal volume of water was added, and the mixture was neutralized wtih 10% aqueous hydrochloric acid. The organic layer that formed was separated and shaken with water until a solid formed. The solid was collected on a filter, washed with water, recrystallized from benzene, and then sublimed at 10 mm. and 130° C. to give 33.0 g. (37% yield) of 4-amino-2,2,5,5-tetrakis(trifluoromethyl)-3-oxazoline as colorless crystals, M.P. 136–138° C. (sealed capillary). The infrared spectrum showed a band at 5.89μ. The $H^1$ NMR spectrum in $(CD_3)_2CO$ at 25° C. showed a broad singlet at 7.66 p.p.m., and at —50° C. showed two singlets of equal area at 8.00 and 8.75 p.p.m. lower field from $(CH_3)_4Si$. The $F^{19}$ NMR spectrum in $(CD_3)_2SO$ showed two septets (J=5.9 c.p.s.) centered at 72.0 and 77.1 p.p.m. higher field from trichlorofluoromethane.

*Analysis.*—Calcd. for $C_7H_2F_{12}N_2O$: C, 23.47; H, 0.56; F, 63.67; N, 7.83. Found: C, 23.88; H, 0.77; F, 64.11; N, 7.89.

Example 2.—4-amino-2,2,5,5-tetrakis(trifluoromethyl)-3-oxazoline $(X^1=X^2=X^3=X^4=F;\ R=Y=H)$

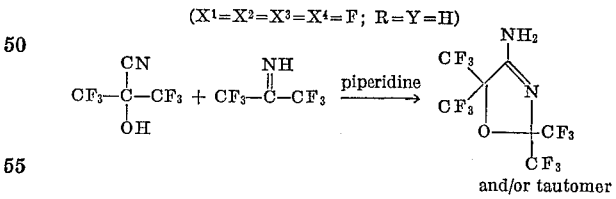

Hexafluoroisopropylidenimine, 76 ml. (ca. 0.7 mole), was bubbled into a solution of 15 ml. of piperidine and 120 g. (0.67 mole) of hexafluoroacetone cyanhydrin in 100 ml. of acetonitrile. The solution was stirred at room temperature for 3 days. An equal volume of water was added and the solution neutralized with 10% hydrochloric acid. The organic and aqueous layers were separated. Water was added to the organic layer causing crystallization. The crystals were collected on a filter, washed with water, recrystallized from benzene, and sublimed at 130° C. and 10 mm. to give 88.9 g. (58.4% yield) of 4-amino-2,2,5,5-tetrakis(trifluoromethyl)-3-oxazoline melting at 136–138° C.

The $F^{19}$ NMR spectrum in $(CD_3)_2CO$ showed multiplets at 73.7 p.p.m. and 78.4 p.p.m.

*Analysis.*—Calcd. for $C_7F_{12}N_2H_2O$: C, 23.67; H, 0.56; F, 63.67; N, 7.83. Found: C, 23.43; H, 0.75; F, 63.49; N, 7.90.

Example 3.—4-amino-2,2-bis(trifluoromethyl)-5-chloro-difluoromethyl-5-difluoromethyl-3-oxazoline ($X^1$=Cl; $X^2$=H, $X^3$=$X^4$=F; R=Y=H)

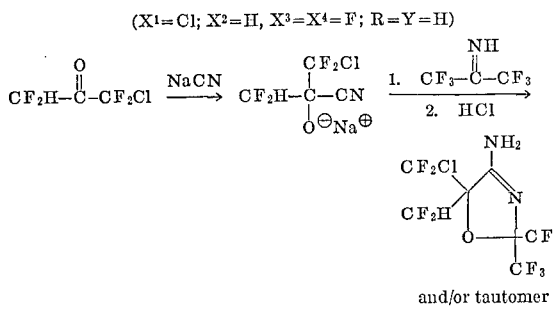

and/or tautomer 1-chloro-1,1,3,3-tetrafluoroacetone, 16.5 g. (0.1 mole), was added dropwise over 30 minutes to a stirred suspension of 4.9 g. (0.1 mole) of powdered sodium cyanide in 75 ml. of dimethylformamide cooled to 0° C. The reaction mixture was stirred at 0° to 10° C. for 2 hours, and then 11 ml. at —10° C. (ca. 0.1 mole) of hexafluoroisopropylidenimine was distilled into the reaction mixture. The mixture warmed spontaneously to 40° C. The mixture was cooled and poured into 250 ml. of 10% hydrochloric acid, and the oil that separated was collected and washed with water, and then dissolved in 25 ml. of 20% fuming sulfuric acid. This solution was poured over ice, and the solid that formed was collected on a filter, washed with water, dried in a desiccator over phosphorus pentoxide, and then sublimed at 100° C. and 10 mm. to give 10.4 g. of 4-amino-2,2-bis(trifluoromethyl)-5-chlorodifluoromethyl-5-difluoromethyl-3-oxazoline as a white crystalline powder, M.P. 101–103° C. The $H^1$ NMR spectrum in $(CD_3)_2CO$ showed a triplet ($J_{FH}$= 52 c.p.s.) to a triplet (J=0.7 c.p.s.) centered at 4.57 p.p.m. (1H) and a broad singlet centered at 5.5 p.p.m. (2H) from $(CH_3)_4Si$. The infrared spectrum showed a band at 5.91μ.

*Analysis.*—Calcd. for $C_7H_3ClF_{10}N_2O$: C, 23.58; H, 0.85; Cl, 9.93; F, 53.29; N, 7.86. Found: C, 23.87; H, 1.27; Cl, 9.72; F, 53.58; N, 7.90.

Example 4.—4-amino-2-chlorodifluoromethyl-2,5,5-tris(trifluoromethyl)-3-oxazoline ($X^1$=$X^2$=$X^4$=F; $X^3$=Cl; R=Y=H)

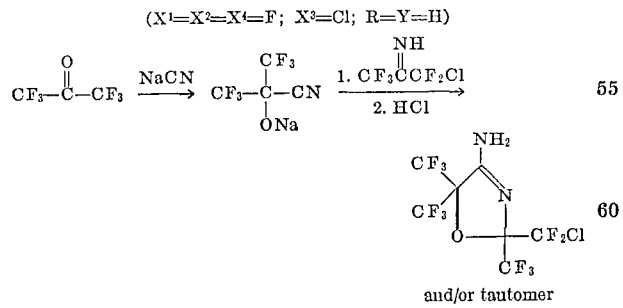

and/or tautomer

Hexafluoroacetone, 10 ml. at —78° C. (0.1 mole), was slowly distilled over a period of 30 minutes into a stirred suspension of 4.9 g. (0.1 mole) of powdered sodium cyanide in 100 ml. of acetonitrile. The reaction mixture was stirred at 25° C. for 2 hours, and 18.2 g. (0.1 mole) of chloropentafluoroisopropylidenimine was added dropwise thereto. Stirring was continued for 2 days, and then the mixture was poured into 200 ml. of 10% hydrochloric acid. The organic layer that separated was washed with water until it solidified. The solid was dried in vacuum over phosphorus pentoxide, and sublimed at 100° C. (10 mm.) to give 11.9 g. (32%) of 4-amino-2-chlorodifluoromethyl-2,5,5-tris(trifluoromethyl) - 3 - oxazoline as a white, crystalline solid, M.P. 103–104° C.

*Analysis.*—Calcd. for $C_7H_2ClF_{11}N_2O$: C, 22.44; H, 0.54; Cl, 9.47; F, 55.80; N, 7.48. Found: C, 23.23; H, 0.54; Cl, 10.24; F, 55.80; N, 8.00.

Example 5.—4-amino-2,2,5-tris(trifluoromethyl) - 5 - difluoromethyl-3-oxazoline ($X^1$=$X^3$=$X^4$=F; $X^2$=H; R=Y=H)

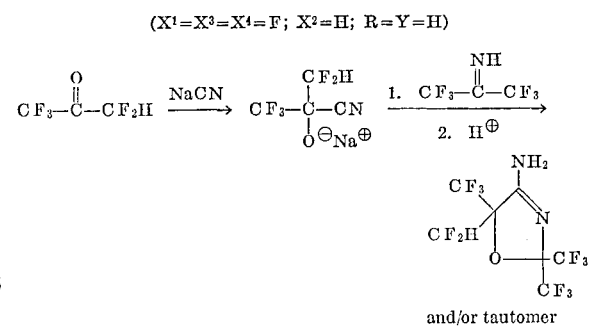

and/or tautomer

Pentafluoroacetone, 22 ml. (ca 0.25 mole), at —78° C. was slowly distilled into a stirred suspension of 12.25 g. (0.25 mole) of powdered sodium cyanide in 200 ml. of acetonitrile. The temperature of the reaction rose spontaneously to 45° C. The reaction mixture was stirred an additional 30 minutes, cooled to 25° C., and filtered. Hexafluoroisopropylidenimine, 27 ml. at —10° C. (ca. 0.25 mole), was distilled into the reaction solution, and the solution was stirred at room temperature for 3 days. An equal volume of water was added, and the solution was neutralized with 10% aqueous hydrochloric acid. The solution was concentrated, and the crystals that formed were collected on a filter, washed with water, recrystallized from benzene and sublimed at 10 mm. and 130° C. to give 17.9 g. (23% yield) of 4-amino-2,2,5-tris(trifluoromethyl)-5-difluoromethyl-3-oxazoline, M.P. 123–125° C. The infrared spectrum showed bands at 3μ, 5.86μ, and 6.22μ, and a strong absorption in the 8 to 10μ region. The $H^1$ NMR spectrum in $(CD_3)_2CO$ showed a triplet (J=51.5 c.p.s.) centered at 6.01 p.p.m. and a broad singlet at 7.08 p.p.m. The $F^{19}$ NMR spectrum in $(CD_3)_2CO$ showed a doublet (J=52 c.p.s.) split to multiplets at 131.3 p.p.m. ($CF_3H$), and multiplets centered at 73.5 p.p.m. ($CF_3$) and at 78.8 p.p.m. (2$CF_3$).

*Analysis.*—Calcd. for $C_6H_3F_{11}N_2O$: C, 24.73; H, 0.89; F, 61.45; N, 8.23. Found: C, 24.59; H, 1.17; F, 61.60; N, 8.27.

Example 6.—4-amino-2,5-bis(trifluoromethyl)-2,5-bis(difluoromethyl)-3-oxazoline ($X^1$=$X^3$=F; $X^2$=$X^4$=H; R=Y=H)

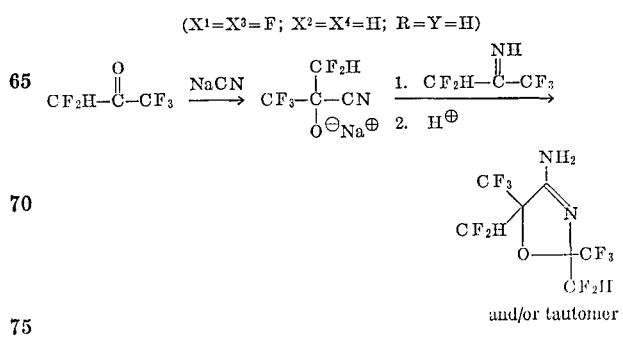

and/or tautomer

Pentafluoroacetone, 8 ml. (ca. 0.09 mole), was slowly distilled into a suspension of 4.4 g. (0.09 mole) of powdered sodium cyanide in 75 ml. of acetonitrile. The temperature of the reaction rose spontaneously to 54° C. The mixture was stirred for an additional 2 hours and filtered. To the solution was added dropwise 13 g. (0.09 mole) of pentafluoroisopropylidenimine. The solution was stirred at room temperature for 3 days. An equal volume of water was added, and the solution was neutralized with 10% aqueous hydrochloric acid. The solution was concentrated, the crystals that formed were collected on a filter, washed with water, recrystallized from benzene, and sublimed at 10 mm. and 130° C. to give 12.7 g. (45% yield) of 4 - amino - 2,5 - bis(trifluoromethyl) - 2,5 - bis(difluoromethyl)-3-oxazoline, M.P. 133–135° C. The infrared spectrum showed bands at $3\mu$ and $5.92\mu$, and strong absorption in the 8 to $10\mu$ region. The $H^1$ NMR spectrum in $(CD_3)_2CO$ showed a triplet (J=55 c.p.s.) at 5.65 p.p.m. ($CF_2H$), a triplet (J=54 c.p.s.) at 6.10 p.p.m. ($CF_2H$), and a very broad signal at 6.5 p.p.m. ($NH_2$). The $F^{19}$ NMR spectrum in $(CD_3)_2CO$ showed multiplets centered at 73.8 p.p.m. ($CF_3$), at 78.5 p.p.m. ($CF_3$), and at 132.2 p.p.m. ($2CF_2H$).

*Analysis.*—Calcd. for $C_7H_4F_{10}N_2O$: C, 26.13; H, 1.25; F, 58.98. Found: C, 26.34; H, 1.54; F, 59.88.

Example 7.—4-amino-2,5,5-tris(trifluoromethyl)-2-difluoromethyl-3-oxazoline ($X^1=X^2=X^3=F$; $X^4=H$; $R=Y=H$)

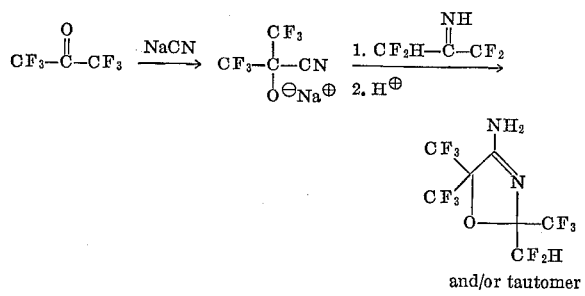

and/or tautomer

Hexafluoroacetone, 10 ml. (ca. 0.09 mole), was slowly distilled into a suspension of 44 g. (0.09 mole) of powdered sodium cyanide in 75 ml. of acetonitrile. The temperature of the reaction rose spontaneously to 56° C. The mixture was stirred for an additional 30 minutes and then filtered. Pentafluoroisopropylidenimine, 13 g. (0.09 mole), was added dropwise, and the solution was stirred at room temperature for 3 days. An equal volume of water was added, and the solution was neutralized with 10% aqueous hydrochloric acid. The solution was concentrated, the crystals that formed were collected on a filter, washed with water, recrystallized from benzene, sublimed at 10 mm. and 130° C. and recrystallized from benzene again to give 12.9 g. (44% yield) of 4-amino-2,5,5-tris(trifluoromethyl)-2-difluoromethyl-3-oxazoline, M.P. 130–132° C. The infrared spectrum showed bands at $3\mu$ and $5.92\mu$, and strong absorption in the 8 to $10\mu$ region. The $H^1$ NMR spectrum in $(CD_3)_2CO$ showed a triplet (J=53 c.p.s.) at 5.90 p.p.m. ($CF_2H$), and a broad singlet at 6.35 p.p.m. The $F^{19}$ NMR spectrum in $(CD_3)_2CO$ showed multiplets centered at 132.1 p.p.m. ($CF_2H$), 78.7 p.p.m. ($CF_3$), and 73.9 p.p.m. ($2CF_3$).

*Analysis.*—Calcd. for $C_6H_3F_{11}N_2O$: C, 24.72; H, 0.89; F, 61.45. Found: C, 24.98; H, 1.48; F, 61.28.

Example 8.—4-amino-2,2-bis(trifluoromethyl)-5,5-bis(difluoromethyl)-3-oxazoline ($X^1=X^2=H$; $X^3=X^4=F$; $R=Y=H$)

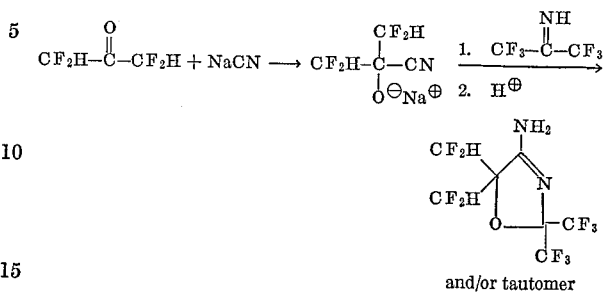

and/or tautomer

Tetrafluoroacetone, 11.7 g. (0.09 mole), was added dropwise to a suspension of 4.4 g. (0.09 mole) of powdered sodium cyanide in 75 ml. of acetonitrile. The temperature rose spontaneously to 61° C. during the addition. The reaction mixture was stirred at room temperature overnight and filtered to remove the unreacted sodium cyanide. Hexafluoroisopropylidenimine, 9.7 ml. (ca. 0.09 mole), was bubbled into the solution and the solution was stirred at room temperature for 3 days. An equal volume of water was added and the solution neutralized with 10% hydrochloric acid. The solution was concentrated on a steam bath and crystallized. The crystals were washed with water, recrystallized from benzene, and sublimed at 115° C. and 10 mm. to give a mixture (4.2 g.) of the desired product and 4-oxo-2,2,5,5-tetrakis(difluoromethyl)oxazolidine. This solid product was treated with 10% sodium hydroxide solution and filtered to remove the 4-oxo-2,2,5,5-tetrakis(difluoromethyl)oxazolidine, which is soluble in dilute alkali. The insoluble residue was dried and then sublimed at 130° C. and 10 mm. to give 3.2 g. (7.3% yield) of 4-amino-2,2-bis(trifluoromethyl)-5,5-bis(difluoromethyl)-3-oxazoline melting at 108–110° C.

The $F^{19}$ NMR spectrum in $(CD_3)_2CO$ showed a multiplet at 79.1 p.p.m. and a doublet (J=54 c.p.s.) split to multiplets centered at 130.9 p.p.m. The $H^1$ NMR spectrum in $(CD_3)_2CO$ showed a triplet (J=54 c.p.s.) centered at $\tau$ 4.08 and a broad singlet at $\tau$ 3.17 ($NH_2$).

*Analysis.*—Calcd. for $C_7F_{10}N_2H_4O$: C, 26.10; H, 1.25; N, 8.69; F, 58.99. Found: C, 26.02; H, 1.29; N, 8.71; F, 58.94.

Example 9.—4-amino-2,2,5-tris(difluoromethyl)-5-trifluoromethyl-3-oxazoline ($X^1=F$; $X^2=X^3=X^4=H$; $R=Y=H$)

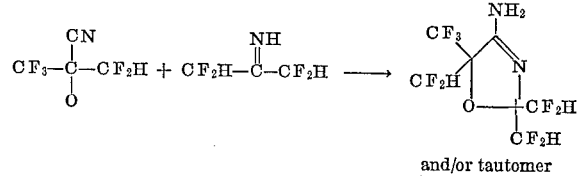

and/or tautomer 1,1,3,3-tetrafluoroisopropylidenimine, 6.6 g. (0.05 mole), was added dropwise to a solution of 8.9 g. (0.05 mole) of pentafluoroacetone cyanohydrin and 2 ml. (0.02 mole) of piperidine in 15 ml. of acetonitrile. The solution was stirred at room temperature for 4 days. An equal volume of water was then added and the solution neutralized with 10% hydrochloric acid. The crystals that formed were collected on a filter, washed with water, washed with 10% sodium hydroxide, and sublimed at 130° C. and 10 mm. to give 3.19 g. (29% yield) of 4-amino-2,2,5-tris(difluoromethyl)-5-(trifluoromethyl)-3-oxazoline melting at 90–92° C. The $H^1$ NMR in $(CD_3)_2CO$ showed peaks in the 2.80 to $5.00\tau$ region. The $F^{19}$ NMR in $(CD_3)_2CO$ showed multiplets at 73.8 p.p.m. ($CF_3$) and multiplets over 400 cycles centered at 132 p.p.m. ($3CF_2H$). Infrared: $2.86\mu$, $2.92\mu$, $2.98\mu$, $3.15\mu$ and $6.19\mu$ for $NH_2$; $5.88\mu$ for C=N.

*Analysis.*—Calcd. for $C_7F_9H_5N_2O$: C, 27.64; F, 56.22; H, 1.66; N, 9.21. Found: C, 27.54; F, 55.69; H, 2.06; N, 9.40.

Example 10.—4-amino-2,2-bis(difluoromethyl)-5,5-bis(trifluoromethyl)-3-oxazoline ($X^1=X^2=F$; $X^3=X^4=H$; $R=Y=H$)

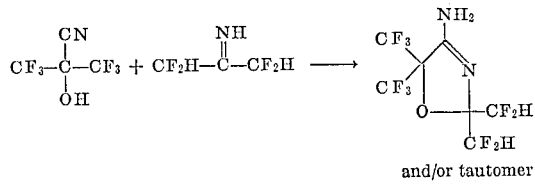

and/or tautomer 1,1,3,3-tetrafluoroisopropylidenimine, 6.5 g. (0.05 mole), was added dropwise to a solution of 9.5 g. (0.05 mole) of hexafluoroacetone cyanhydrin and 2 ml. (0.02 mole) of piperidine in 15 ml. of acetonitrile. The solution was stirred at room temperature for 4 days. An equal volume of water was then added and the solution neutralized with 10% hydrochloric acid. The crystals that formed collected on a filter, washed with 10% sodium hydroxide, and sublimed at 130° C. and 5 mm. to give 2.90 g. (18% yield) of 4-amino-2,2-bis(difluoromethyl)-5,5-bis(trifluoromethyl)-3-oxazoline melting at 105–108° C. The $H^1$ NMR in $(CD_3)_2CO$ showed a triplet (J=54 c.p.s.) centered at $4.15\tau$ ($2CF_2H$) and a broad singlet at $4.37\tau$ ($NH_2$). The $F^{19}$ NMR in $(CD_3)_2CO$ showed multiplets at 65.1 p.p.m. ($2CF_3$) and multiplets centered at 131.9 p.p.m. ($2CF_2H$). Infrared: $2.87\mu$, $3.05\mu$, and $3.16\mu$ for $NH_2$; $5.90\mu$ for —C=N.

*Analysis.*—Calcd. for $C_9F_{10}H_4N_2O$: C, 26.09; F, 58.99; H, 1.26; N, 8.69. Found: C, 26.50; F, 58.94; H, 1.70; N, 8.75.

Example 11.—4-amino-2,5,5-tris(difluoromethyl)-2-trifluoromethyl-3-oxazoline ($X^1=X^2=X^4=H$; $X^3=F$; $R=Y=H$)

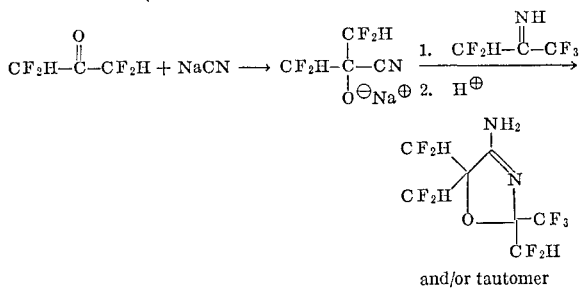

and/or tautomer 1,1,3,3-tetrafluoroacetone, 15 g. (0.12 mole), was added dropwise to a suspension of 4.9 g. (0.12 mole) of powdered sodium cyanide in 75 ml. of acetonitrile. During the addition, the temperature rose spontaneously to 70° C. The mixture was stirred for 30 minutes and filtered. Pentafluoroisopropylidenimine, 16.9 g. (0.1 mole), was then added dropwise to the filtrate. The temperature rose spontaneously to 50° C. during the addition. The solution was stirred at room temperature for 4 days. An equal volume of water was added and the solution was neutralized with 10% hydrochloric acid. The aqueous and organic layers were separated and the organic layer was extracted with water. The aqueous layers were combined and distilled. The fraction boiling at 98° C. partially solidified. The solid was collected on a filter, washed with 10% sodium hydroxide, and recrystallized from benzene to give 3.39 g. (97% yield) of 4-amino-2,5,5-tris(difluoromethyl)-2-trifluoromethyl-3-oxazoline melting at 129–131° C. The $H^1$ NMR in $(CD_3)_2SO$ showed a singlet at $\tau$ 6.7 ($NH_2$), a triplet (J=53 c.p.s.) centered at $\tau$ 3.58 (2H), and a triplet (J=53 c.p.s.) centered at $\tau$ 3.91 (1H). Infrared: $5.90\mu$ for C=N.

*Analysis.*—Calcd. for $C_7F_9H_5N_2O$: C, 27.63; F, 56.21; H, 1.65; N, 9.26. Found: C, 27.82; F, 55.91; H, 1.72; N, 9.90.

Example 12.—4-amino-2-difluoromethyl-6,6,7,7,8,8-hexafluoro-2-trifluoromethyl-3-aza-1-oxaspiro[4,3]oct-3-ene ($X^1+X^2=CF_2$; $X^3=F$; $X^4=H$; $Y=R=H$)

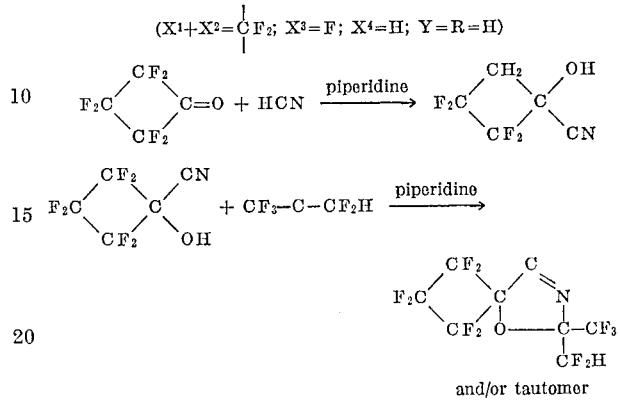

and/or tautomer

Hexafluorocyclobutanone, 36 ml., was added to 24 ml. of hydrogen cyanide and 1 ml. of piperidine at −10° to 0° C. After standing overnight at ca. 25° C., the mixture was distilled to give hexafluorocyclobutanone cyanhydrin, B.P. 63° C./20 mm.

Pentafluoroisopropylidenimine, 5 g. (0.03 mole), was added dropwise to a solution of 7 g. (0.03 mole) of hexafluorocyclobutanone cyanhydrin and 2 ml. of piperidine in 15 ml. of acetonitrile. The solution was stirred at room temperature for 3 days. An equal volume of water was added and the solution was neutralized with 10% hydrochloric acid. The organic and aqueous layers were separated. The crystals that formed in the organic layer were collected on a filter, washed with water, and sublimed at 130° C. and 10 mm. to give 3.39 g. (32% yield) of 4-amino-2-difluoromethyl-6,6,7,7,8,8-hexafluoro-2-trifluoromethyl-3-aza-1-oxaspiro[4,3]oct-3-ene as colorless crystals melting at 112–115° C. Recrystallization of a portion of this material from benzene raised the melting point to 125.6–126.0° C. The $H^1$ NMR in $(CD_3)_2CO$ showed a triplet (J=53 c.p.s.) centered at $\tau$ 4.22 ($CF_2H$) and a broad region at $\tau$ 3.41 ($NH_2$). The $F^{19}$ NMR in $(CD_3)_2CO$ showed doublets (J=53 c.p.s.) split to multiplets at 136.5 p.p.m. ($CF_2H$), multiplets at 128.4, 130.4, and 134.8 p.p.m. (6F), and a triplet (J=7 c.p.s.) split to doublets (J=2 c.p.s.) at 81.2 p.p.m. ($CF_3$). Infrared: $2.84\mu$, $2.97\mu$, $3.03\mu$, $3.15\mu$ for $NH_2$; $5.87\mu$ for C=N.

*Analysis.*—Calcd. for $C_8F_{11}H_3N_2O$: C, 27.28; F, 59.35; H, 0.86; N, 7.95. Found: C, 27.65; F, 58.44; H, 0.89; N, 7.78.

Example 13.—4-amino-2,2-bis(trifluoromethyl)-6,6,7,7,8,8-hexafluoro-3-aza-1-oxaspiro[4,3]oct-3-ene ($X^1+X^2=CF_2$; $X^3=X^4=F$; $R=Y=H$)

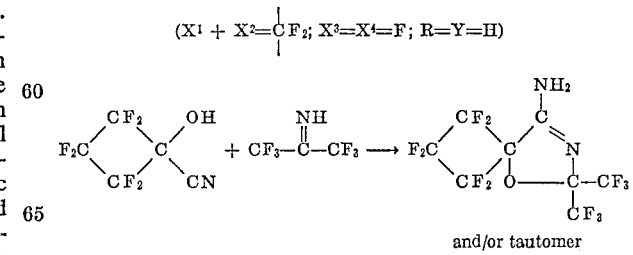

and/or tautomer

Hexafluoroisopropylidenimine, 5 ml. (ca. 0.03 mole), was bubbled into a solution of 7 g. (0.03 mole) of hexafluorocyclobutanone cyanhydrin and 2 ml. (0.02 mole) of piperidine in 15 ml. of acetonitrile. The solution was stirred at room temperature for 4 days. An equal volume of water was then added and the solution was neutralized with 10% hydrochloric acid. The crystals that formed were collected on a filter, washed with water, washed with 10% sodium hydroxide, and sublimed at 130° C. and 10 mm. to give 6.51 g. (58% yield) of 4-amino-2,2-bis(trifluoromethyl)-6,6,7,7,8,8-hexafluoro-3-aza-1 - oxaspiro[4,3]oct-3-ene melting at 135–137° C. The H$^1$ NMR in (CD$_3$)$_2$CO showed a broad singlet at 2.52$\tau$. The F$^{19}$ NMR in (CD$_3$)$_2$CO showed a multiplet at 82.1 p.p.m. (2CF$_3$) and multiplets at 127.6 p.p.m., 134.7 p.p.m., and 124.5 p.p.m. (6F). Infrared: 2.87$\mu$, 3.00$\mu$, 3.06$\mu$, and 3.15$\mu$ for NH$_2$; 5.91$\mu$ for C=N.

*Analysis*—Calcd. for C$_8$F$_{12}$H$_2$N$_2$O: C, 25.96; F, 61.61; H, 0.54; N, 7.57. Found: C, 26.14; F, 61.43; H, 0.72; N, 6.76.

Additional specific examples of 4-amino-3-oxazolines (or their tautomeric 4-iminooxazolidines) in which R and Y are H that can be prepared by the procedures of this invention, e.g., those of Examples 1–13, along with the reactants necessary to prepare them, are listed in the following Table I:

TABLE I

| Reactants | | | Product Oxazolines (or Tautomer) |
|---|---|---|---|
| Ketone | Cyanide | Imine | |
| CF$_3$—CO—CF$_3$ | KCN | ClCF$_2$—C(=NH)—CF$_2$Cl | 4-amino-2-(CF$_2$Cl)-5,5-bis(CF$_3$) oxazoline |
| ClCF$_2$—CO—CF$_2$Cl | NaCN | CF$_3$—C(=NH)—CF$_3$ | 4-amino-2,2-bis(CF$_3$)-5,5-bis(ClCF$_2$) oxazoline |
| ClCF$_2$—CO—CF$_3$ | NaCN | CF$_3$—C(=NH)—CF$_2$H | 4-amino-2-(CF$_3$)-2-(CF$_2$H)-5-(CF$_3$)-5-(CF$_2$Cl) oxazoline |
| ClCF$_2$—CO—CF$_2$Cl | KCN | ClCF$_2$—C(=NH)—CF$_2$Cl | 4-amino-2,2-bis(CF$_2$Cl)-5,5-bis(CF$_2$Cl) oxazoline |
| HCF$_2$—CO—CF$_2$H | NaCN | HCF$_2$—C(=NH)—CF$_2$H | 4-amino-2,2-bis(CF$_2$H)-5,5-bis(HCF$_2$) oxazoline |
| cyclo-(CF$_2$)$_4$C=O | NaCN | CF$_3$—C(=NH)—CF$_3$ | 4-amino spiro oxazoline with cyclobutane-(CF$_2$)$_4$ and 2,2-bis(CF$_3$) |
| cyclo-(CF$_2$)$_3$C=O | KCN | HCF$_2$—C(=NH)—CF$_2$H | 4-amino spiro oxazoline with cyclopropane-(CF$_2$)$_3$ and 2,2-bis(CF$_2$H) |
| cyclo-(CF$_2$)$_3$C=O | NaCN | CF$_3$—C(=NH)—CF$_2$H | 4-amino spiro oxazoline with cyclopropane-(CF$_2$)$_3$ and 2-CF$_3$, 2-CF$_2$H |
| cyclo-(CF$_2$)$_3$C=O | NaCN | CF$_3$—C(=NH)—CF$_2$Cl | 4-amino spiro oxazoline with cyclopropane-(CF$_2$)$_3$ and 2-CF$_3$, 2-CF$_2$Cl |

Example 14.—4-acetylamino-2,2,5,5-tetrakis(trifluoromethyl)-3-oxazoline $(X^1=X^2=X^3=X^4=F;\ R=H;\ Y=-\underset{\underset{O}{\|}}{C}-CH_3)$

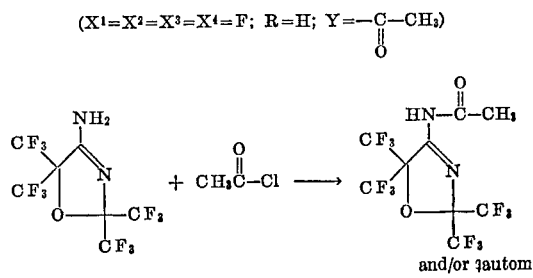

A mixture of 6.3 g. of 4 - amino-2,2,5,5-tetrakis(trifluoromethyl)-3-oxazoline and 25 ml. of acetyl chloride was heated in an 80-ml. Hastelloy C® bomb at 200° C. for 8 hours. The bomb was cooled and vented, and the suspended solid was collected on a filter and recrystallized from ethanol. There was obtained 3.1 g. of 4-acetylamino - 2,2,5,5 - tetrakis(trifluoromethyl) - 3 - oxazoline as colorless needles, M.P. 189–190° C. (sealed capillary). The $H^1$ NMR spectrum in $(CD_3)_2CO$ showed a singlet at 2.37 p.p.m. (3H) and a broad peak at 10.3 p.p.m. (1H) from $(CH_3)_4Si$. The infrared spectrum showed bands at $5.77\mu$ and $6.04\mu$. The ultraviolet spectrum in ethanol showed $\lambda_{max}$ 222 m$\mu$ and $\lambda_{max}$ 262 m$\mu$. The 262 m$\mu$ absorption increased as the sample was diluted.

*Analysis.*—Calcd. for $C_9H_4F_{12}N_2O_4$: C, 27.01; H, 1.01; F, 56.98; N, 7.70. Found: C, 27.38; H, 1.30; F, 56.92; N, 7.81.

The following list of specific 4-acylamino - 3 - oxazolines (or their tautomeric acyliminooxazolidines), in which Y is

and the reactants from which they are prepared as by essentially the procedure of Example 14 are listed in Table II:

TABLE II

| Reactants | | Products |
|---|---|---|
| 4-amino-3-oxazoline (or Tautomer) | Acyl Halide | 4-acylamino-3-oxazoline (or Tautomer) |

TABLE II—Continued

| Reactants | | Products |
|---|---|---|
| 4-amino-3-oxazoline (or Tautomer) | Acyl Halide | 4-acylamino-3-oxazoline (or Tautomer) |

(structures continued from previous page — see original image for details)

Example 15.—4-methylamino- and 4-dimethylamino-2,2,5,5-tetrakis(trifluoromethyl)-3oxazoline ($X^1=X^2=X^3=X^4=F$; R=—$CH_3$; Y=H)
($X^1=X^2=X^3=X^4=F$; R=Y=—$CH_3$)

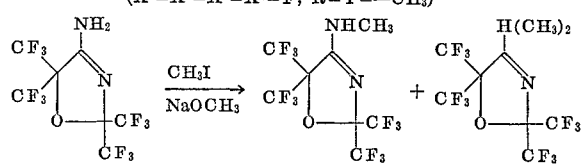

Methyl iodide, 16 g. (0.11 mole), was added dropwise to a solution of 17.9 g. (0.05 mole) of 4-amino-2,2,5,5-tetrakis(trifluoromethyl)-3-oxaline [or its tautomer, 4-imino - 2,2,5,5 - tetrakis(trifluoromethyl)oxazolidine] and 6.0 g. (0.11 mole) of sodium methoxide in 50 ml. of dimethyl sulfoxide. The mixture was stirred overnight and then poured into 200 ml. of water. The organic layer was collected in 50 ml. of ether, and the ether solution was washed with water and dried over magnesium sulfate. Distillation gave two main fractions. The lower boiling fraction, 6.2 g., B.P. 88–90° C. (50 mm.), solidified upon cooling. Recrystallization from pentane gave 4.1 g. of 4-methylamino-2,2,5,5-tetrakis(trifluoromethyl) - 3 - oxazoline as colorless crystals, M.P. 59.5–60.5° C. The infrared spectrum showed a band at 4.96μ. The $H^1$ NMR spectrum in $(CD_3)_2CO$ showed a broad signal at τ 2.25 (NH) and a doublet (J=4.7) at τ 6.88 ($CH_3$) that goes to a singlet upon the addition of $D_2O$. The $F^{19}$ NMR spectrum showed two septets (J=5.8) centered at 72.3 and 77.2 p.p.m. from trichlorofluoromethane.

Analysis.—Calcd. for $C_8H_4F_{12}N_2O$: C, 25.82; H, 1.08; F, 61.27; N, 7.53. Found: C, 25.58; H, 1.21; F, 61.23; N, 7.25.

The higher boiling fraction, 4.9 g., B.P. 92–92.5° C. (50 mm.), was further purified by cooling to —10° C., filtering off the precipitated solid, and redistilling the filtrate to give 2.7 g. of 4-dimethylamino-2,2,5,5-tetrakis-(trifluoromethyl)-3-oxazoline as a colorless liquid, B.P. 92° C. (50 mm.); $n_D^{25}$, 1.3460. The infrared spectrum showed a band at 6.07μ. The $H^1$ NMR spectrum of a neat sample showed a singlet at τ 6.84, and the $F^{19}$ spectrum showed two septets (J=4.7) centered at 70.1 and 78.2 p.p.m. from trichloroflloromethane.

Analysis.—Calcd. for $C_9H_6F_{12}N_2O$: C, 27.99; H, 1.57; F, 59.03; N, 7.26. Found: C, 27.72; H, 1.80; F, 59.23; N, 7.14.

Example 16.—4-methylamino-2,5,5-tris-(trifluoromethyl)-2-difluoromethyl-3-oxazoline ($X^1=X^2=X^3=F$; $X^4=H$; $R=-CH_3$; $Y=H$)

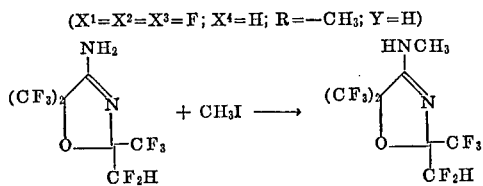

Methyl iodide, 20.8 g. (0.14 mole), was added dropwise to a solution of 22 g. (0.07 mole) of 4-amino-2,5,5-tris(trifluoromethyl)-2-difluoromethyl-3-oxazoline and 7.8 g. (0.14 mole) of sodium methoxide in 60 ml. of dimethyl sulfoxide. The solution was stirred at room temperature for 5 days and poured into 200 ml. of water. The organic layer was collected in 100 ml. of ether and the ether solution was washed with water and dried over magnesium sulfate. The solution was distilled, the fraction boiling at 108° (50 mm.) partially solidified. The solid was collected and recrystallized from pentane to give 3.82 g. (11% yield) of 4-methylamino-2,5,5-tris(trifluoromethyl)-2-difluoromethyl-3-oxazoline. The $H^1$ NMR in $(CD_3)_2CO$ showed a triplet (J=53 c.p.s.) at 4.30τ ($CF_2H$), a broad singlet at 2.95τ ($NH_2$), and a doublet (J=4) at 7.35τ ($CH_3$). The $F^{19}$ NMR showed doublets (J=53) split to multiplets at 133.8 p.p.m. ($CF_2H$), and multiplets at 78.6 p.p.m. ($CF_3$) and 74.6 p.p.m. ($2CF_3$). Infrared: 2.89μ and 3.07μ for NH; 3.52μ and 3.38μ for saturated CH; and 6.09μ for C=N.

*Analysis.*—Calcd. for $C_6F_{11}H_5N_2O$: C, 27.13; F, 59.01; H, 1.43; N, 7.91. Found: C, 27.06; F, 58.90; H, 1.41; N, 7.71.

Specific alkyl derivatives of 4-amino-3-oxazolines (or their tautomeric 4-iminooxazolidines) in which R and/or Y of the general Formula I are alkyl groups having 1.4 carbon atoms, and the reactants from which they are prepared, as by essentially the procedure of Examples 15 and 16, are listed in Table III.

TABLE III

| Reactants | | Products |
|---|---|---|
| 4-amino-3-oxazoline (or Tautomer) | Alkyl Halide | 4-alkylamino-3-oxazoline (or Tautomer) |
| [structure: $NH_2$, $CF_3$, $CF_3$, O—$CF_2Cl$, $CF_2Cl$] | $CH_3$\ CH—Br / $CH_3$ | [structure: $HN-CH(CH_3)_2$, $CF_3$, $CF_3$, O—$CF_2Cl$, $CF_2Cl$] |
| [structure: $NH_2$, $ClCF_2$, $ClCF_2$, O—$CF_3$, $CF_3$] | $(CH_3)_3CCl$ | [structure: $HN-C(CH_3)_3$, $ClCF_2$, $ClCF_2$, O—$CF_3$, $CF_3$] |
| [structure: $NH_2$, $CF_3$, $ClCF_2$, O—$CF_3$, $CF_2H$] | $C_2H_5I$ | [structure: $HN-C_2H_5$, $CF_3$, $ClCF_2$, O—$CF_3$, $CF_2H$] |
| | | [structure: $N(C_2H_5)_2$, $CF_3$, $ClCF_2$, O—$CF_3$, $CF_2H$] |
| [structure: $NH_2$, $ClCF_2$, $ClCF_2$, O—$CF_2Cl$, $CF_2Cl$] | n-$C_3H_7Br$ | [structure: $HN-CH_2CH_2CH_3$, $ClCF_2$, $ClCF_2$, O—$CF_2Cl$, $CF_2Cl$] |
| [structure: $NH_2$, $HCF_2$, $HCF_2$, O—$CF_2H$, $CF_2H$] | $CH_3I$ | [structure: $HN-CH_3$, $HCF_2$, $HCF_2$, O—$CF_2H$, $CF_2H$] |
| | | + |
| | | [structure: $N(CH_3)_2$, $HCF_2$, $HCF_2$, O—$CF_2H$, $CF_2H$] |

TABLE III—Continued

| Reactants | | Products |
|---|---|---|
| 4-amino-3-oxazoline (or Tautomer) | Alkyl Halide | 4-alkylamino-3-oxazoline (or Tautomer) |
| (structure with CF₃, F₂C, CF₂, CF₂H, CF₃, NH₂) | C₃I | (structure with HNCH₃) + (structure with N(CH₃)₂) |

Example 17.—4-carbethoxyamino-2-difluoromethyl-2,5,5-tris(trifluoromethyl)-3-oxazoline $(R=H; Y=-\overset{O}{\underset{\|}{C}}OR^2; R^2=-C_2H_5; X^1=X^2=X^3=F; X^4=H)$

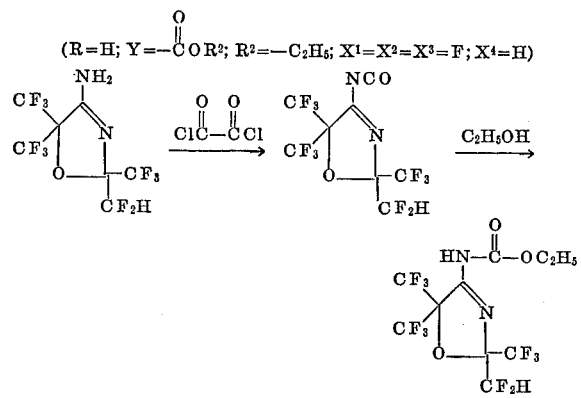

A solution of 15 g. of 4-amino-2-difluoromethyl-2,5,5-tris(trifluoromethyl)-3-oxazoline in 50 ml. of oxalyl chloride was heated to reflux for 2 days, and then distilled under reduced pressure. There was obtained 11.21 g. of 4 - isocyanato - 2 - difluoromethyl - 2,5,5 - tris(trifluoromethyl)-3-oxazoline as a colorless liquid, B.P. 67° C. (50 mm.).

Two grams of this freshly distilled isocyanate was added rapidly to a solution of 1 ml. of ethanol in 50 ml. of diethyl ether. The reaction mixture was evaporated to dryness under a stream of nitrogen and the white residue was recrystallized from ether-pentane to give 1.67 g. of 4-carbethoxyamino-2-difluoromethyl - 2,5,5 - tris(trifluoromethyl)-3-oxazoline as colorless matting needles, M.P. 132–133° C. The $F^{19}$ NMR spectrum in $(CD_3)_2CO$ showed multiplets at 70.8 p.p.m. (6F) and 76.6 p.p.m. (3F) and a doublet (J=53 c.p.s.) split further to multiplets at 133.7 p.p.m. from trichlorofluoromethane. The $H^1$ NMR spectrum showed a broad absorption for NH at $\tau$ 0.25; a triplet (J=53 c.p.s.) for $CF_2H$ at $\tau$ 3.64; a quartet (J=7 c.p.s.) for $CH_2$ at $\tau$ 5.72; and a triplet (J=7 c.p.s.) for $CH_3$ at $\tau$ 8.72.

*Analysis.*—Calcd. for $C_{10}H_7F_{11}N_2O_3$: C, 29.14; H, 1.71; F, 50.71; N, 6.77. Found: C, 28.84; H, 1.61; F, 50.88; N, 6.94.

When the process of Example 17 is repeated with the specific 4-amino-3-oxazolines listed in the first column of the following Table IV substituted for the starting ozazoline in that example and is first reacted with oxalyl chloride and the resulting isocyanate then reacted with the specific alcohols listed in the second column of the table, the specific urethanes, or carbamates, listed in the third column are formed.

TABLE IV

| 4-amino-3-oxazoline (or Tautomer) | Alcohol | Urethane Product (or Tautomer) |
|---|---|---|
| (structure: CF₃, CF₃, NH₂, CF₃, CF₃) | CH₃OH | (structure: CF₃, CF₃, HN—COCH₃, CF₃, CF₃) |
| (structure: ClCF₂, ClCF₂, NH₂, CF₂Cl, CF₂Cl) | CH₃(CH₂)₃OH | (structure: ClCF₂, ClCF₂, HN—CO(CH₂)₃CH₃, CF₂Cl, CF₂Cl) |
| (structure: CHF₂, CF₃, NH₂, CF₂H, CF₃) | ⟨S⟩OH | (structure: HCF₂, CF₃, NH—CO—⟨S⟩, CF₂H, CF₃) |

TABLE IV—Continued

| 4-amino-3-oxazoline (or Tautomer) | Alcohol | Urethane Product (or Tautomer) |
|---|---|---|
| (structure) | $C_2H_5OH$ | (structure) |
| (structure) | $CH_3(CH_2)_8OH$ | (structure) |

The 4-amino-3-oxazolines, or their tautomers, or alkyl and acyl derivatives thereof of this invention are useful for modifying polymers as by lowering the forming temperatures or pressures or by plasticizing the polymers.

The modification of poly(methyl methacrylate) resin is illustrated by the following experiment:

Example A

The following compositions were prepared:

(a) Five-tenths gram of poly(methyl methacrylate) resin containing no additives.

(b) A mixture of 0.5 g. of poly(methyl methacrylate) resin (molecular weight about 100,000; residual monomer content less than 1%) and 0.1 g. of 4-amino-2,2,5,5-tetrakis(trifluoromethyl)-3-oxazoline.

(c) A mixture of 0.5 g. of poly(methyl methacrylate) resin and 0.1 g. of 4-amino-5-chlorodifluoromethyl-5-difluoromethyl-2,2-bis(trifluoromethyl)-3-oxazoline.

(d) A mixture of 0.5 g. of poly(methyl methacrylate) resin and 0.1 g. of 4-dimethylamino-2,2,5,5-tetrakis-(trifluoromethyl)-3-oxazoline.

(e) A mixture of 0.5 g. of poly(methyl methacrylate) resin and 0.1 g. of 4-acetylamino-2,2,5,5-tretrakis-(trifluoromethyl)-3-oxazoline.

(f) A mixture of 0.5 g. of poly(methyl methacrylate) resin and 0.1 g. of 4-amino-2,2,5-tris(difluoromethyl)-5-trifluoromethyl-3-oxazoline.

(g) A mixture of 0.5 g. of poly(methyl methacrylate) resin and 0.1 g. of 4-methylamino-2-difluoro-2,5,5-tris(trifluoromethyl)-3-oxazoline.

(h) A mixture of 0.5 g. of poly(methyl methacrylate) resin and 0.1 g. of 4-amino-6,6,7,7,8,8-hexafluoro-2,2-bis-(trifluoromethyl)-3-aza-1-oxaspiro[4,3]oct-3-ene.

(i) A mixture of 0.5 g. of poly(methyl methacrylate) resin and 0.1 g. of 4-amino-2-difluoromethyl-6,6,7,7,8,8-hexafluoro - 2 - trifluoromethyl-3-aza-1-oxaspiro[4,3]oct-3-ene.

Circular films were pressed from a compact pile of each composition at 143° C. and 10,000 lbs. ram pressure for 10 seconds.

The film pressed from composition (a) was 14 mils thick, only 1⅝ inches in diameter and was incompletely coalesced around the edges.

The film pressed from composition (b) was 9 mils thick and 2¼ inches in diameter.

The film pressed from composition (c) was 10 mils thick and 2⅛ inches in diameter.

The film pressed from composition (d) was 8 mils thick and 2⅜ inches in diameter.

The film pressed from composition (e) was 11 mils thick and 2⅛ inches in diameter.

The film pressed from composition (f) was 10 mils thick and 2¼ inches in diameter.

The film pressed from composition (g) was 9 mils thick and 2¼ inches in diameter.

The film pressed from composition (h) was 8 mils thick and 2½ inches in diameter.

The film pressed from composition (i) was 8 mils thick and 2½ inches in diameter.

This experiment shows that the forming temperatures or pressures for poly(methyl methacrylate) resin are lowered by the addition of the oxazolines of this invention.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the group consisting of:

I.

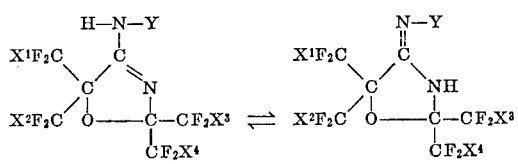

II. Salts of the compounds of Formula I with alkali metals and ammonium and substituted-ammonium radicals,

III.

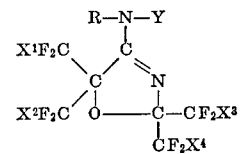

and

IV.

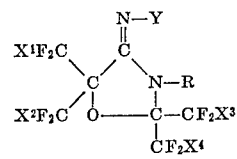

wherein:
  $X^1$ and $X^2$ singly, are alike or different and are selected from the group consisting of hydrogen, fluorine and chlorine, or, jointly, are perfluoroalkylene of 1 to 2 carbons;
  $X^3$ and $X^4$ are alike or different and are selected from the group consisting of hydrogen, fluorine and chlorine;

R is alkyl of 1–4 carbons; and
Y is selected from the group consisting of hydrogen, alkyl of 1–4 carbons, $$-\overset{O}{\underset{\|}{C}}-R_1 \text{ and } -\overset{O}{\underset{\|}{C}}-OR^2$$

R¹ being alkyl of 1–4 carbons, aryl, alkaryl, or aralkyl of 6–10 carbons or substituted aryl, alkaryl or aralkyl of 6–10 carbons, wherein the substituents are selected from up to three members of the group consisting of fluorine, chlorine and bromine, and R² being alkyl or cycloalkyl of up to 10 carbons;

the total number of carbons in R and Y not exceeding 14.

2. The compound of Formula I of claim 1 in which $X^1=X^2=X^3=X^4=F$ and $Y=H$, 4-amino, 2,2,5,5-tetrakis(trifluoromethyl)-3-oxazoline.

3. The compound of Formula I of claim 1 in which $X^1=Cl$, $X^2=H$, $X^3=X^4=F$ and $Y=H$, 4-amino-2,2-bis(trifluoromethyl) - 5 - chlorodifluoromethyl - 5 - difluoromethyl-3-oxazoline.

4. The compound of Formula I of claim 1 in which $X^1=X^2=X^4=F$, $X^3=Cl$ and $Y=H$, 4-amino-2-chlorodifluoromethyl-2,5,5-tris(trifluoromethyl)-3-oxazoline.

5. The compound of Formula I of claim 1 in which $X^1=X^3=F$, $X^2=X^4=H$ and $Y=H$, 4-amino-2,5-bis(trifluoromethyl)-2,5-bis(difluoromethyl)-3-oxazoline.

6. The compound of Formula I of claim 1 in which $X^1=X^2=X^3=F$, $X^4=H$ and $Y=H$, 4-amino-2,5,5-tris(trifluoromethyl)-2-difluoromethyl-3-oxazoline.

7. The compound of Formula I of claim 1 in which $X^1=X^2=X^3=X^4=F$, and $$Y=-\overset{O}{\underset{\|}{C}}CH_3$$

4-acetylamino-2,2,5,5-tetrakis(trifluoromethyl) - 3 - oxazoline.

8. The compound of formula I of claim 1 in which $X^1$ and $X^2$, jointly, are $$\overset{|}{\underset{|}{C}}F_2$$

$X^3=F$ and $X^4=Y=H$, 4-amino-2-difluoromethyl-6,6,7,7,8,8 - hexafluoro - 2 - trifluoromethyl-3-aza-1-oxaspiro[4,3]oct-3-ene.

9. The compound of Formula III of claim 1 in which $X^1=X^2=X^3=X^4=F$, $R=-CH_3$ and $Y=-CH_3$, 4-dimethylamino - 2,2,5,5 - tetrakis(trifluoromethyl) - 3 - oxazoline.

10. The sequential process of preparing a compound of Formula I of claim 1 which comprises serially reacting, at a temperature of −50° C. to 100° C., a fluoroketone of the formula $$X^1-CF_2-\overset{O}{\underset{\|}{C}}-CF_2-X^2$$

(1) with an alkali metal cyanide, then (2) with an imine of the formula $$X^3CF_2-\overset{NH}{\underset{\|}{C}}-CF_2X^4$$

and (3) acidifying the resulting reaction mixture, $X^1$, $X^2$, $X^3$ and $X^4$ being as in claim 1.

11. The process of claim 10 carried out in a polar reaction medium.

12. The process of claim 11 in which the polar reaction medium is selected from the group consisting of dimethylformamide, acetonitrile, dimethyl sulfoxide and diethylene glycol dimethyl ether.

13. The process of claim 10 in which the fluoroketone is hexafluoroacetone.

14. The process of claim 10 in which the fluoroketone is hexafluoroacetone and the imine is hexafluoroisopropylidenimine.

15. The process of claim 10 in which the fluoroketone is 1-chloro-1,1,3,3-tetrafluoroacetone and the imine is hexafluoroisopropylidenimine.

16. The process of claim 10 in which the fluoroketone is hexafluoroacetone and the imine is chloropentafluoroisopropylidenimine.

17. The process of preparing a compound of Formula I of claim 1 which comprises reacting, in the presence of a strongly basic amine, (1) a polyhaloisopropylidenimine of the formula $$X^3CF_2-\overset{NH}{\underset{\|}{C}}-CF_2X^4$$

with (2) a fluoroketone cyanhydrin of the formula $$X^1CF_2-\overset{OH}{\underset{|}{\underset{CN}{C}}}-CF_2X^2$$

$X^1$, $X^2$, $X^3$ and $X^4$ being as in claim 1.

18. The process of claim 17 carried out in a polar reaction medium.

19. The process of claim 18 in which the polar reaction medium is selected from the group consisting of dimethylformamide, acetonitrile, dimethyl sulfoxide and diethylene glycol dimethyl ether.

20. The process of claim 17 in which (1) the polyhaloisopropylidenimine is pentafluoroisopropylidenimine and (2) the fluoroketone cyanhydrin is hexafluorocyclobutanone cyanhydrin.

References Cited

Eichenberger et al., Helv. Chim. Acta, vol. 38, pp. 284–295 (1955).

ALTON D. ROLLINS, *Primary Examiner.*

U.S. Cl. X.R.

260—30.4, 464, 465.6, 566, 593